United States Patent [19]

Crosser et al.

[11] 3,812,532

[45] May 21, 1974

[54] RANDOM ACCESS MEMORY WITH TAPE RETURN TO A MIDTAPE REFERENCE POSITION AFTER READING

[75] Inventors: David Keith Crosser, Placentia; Leonard E. Mell, Orange; John F. Reuvers, Santa Ana, all of Calif.

[73] Assignee: Carter Industries, Inc., Santa Ana, Calif.

[22] Filed: Sept. 25, 1972

[21] Appl. No.: 292,106

[52] U.S. Cl. .................................. 360/72, 353/26

[51] Int. Cl. .... G11b 15/52, G11b 15/22, G11b 15/06

[58] Field of Search ........... 179/100.2 S, 100.2 MD, 179/100.1 VC; 35/35 C; 353/26; 340/172.5, 174.1 C

[56] References Cited

UNITED STATES PATENTS

| | | | |
|---|---|---|---|
| 3,423,743 | 1/1969 | Silverman | 340/174.1 C |
| 3,723,666 | 3/1923 | Ferrari | 179/100.2 S |
| 3,531,575 | 9/1970 | Kobler et al. | 35/35 C |
| 3,711,657 | 1/1973 | Niioka et al. | 179/100.2 S |
| 3,405,461 | 10/1968 | Joslow | 179/100.2 S |
| 3,728,685 | 4/1973 | Stalnert | 340/172.5 |
| 3,700,320 | 10/1972 | Brewer | 353/26 |
| 3,579,195 | 5/1971 | Hallmark | 340/174.1 C |
| 3,334,194 | 8/1967 | Chang | 179/100.2 S |

*Primary Examiner*—James W. Moffitt
*Assistant Examiner*—Alfred H. Eddleman
*Attorney, Agent, or Firm*—Gausewitz, Carr & Rothenberg

[57] ABSTRACT

A selected one of a number of messages prerecorded on a tape is rapidly identified and read by a transporter control arrangement in which the tape read heads are positioned near the tape midpoint in a reference position and selection of a number identifying a unique one of the recorded messages causes the transporter to move the tape in an appropriate direction. Tape motion is at high speed until a point close to, but in advance of the selected message is reached. Then tape motion is at an intermediate slower speed until the beginning of the selected message is attained, at which time, a still slower read speed is employed. At the end of the reading of the selected message, the tape is rapidly returned to its reference position in a manner analagous to the tape travel to the selected message.

11 Claims, 8 Drawing Figures

RANDOM ACCESS MEMORY WITH TAPE RETURN TO A MIDTAPE REFERENCE POSITION AFTER READING

BACKGROUND OF THE INVENTION

1. Field of the Invention

The present invention relates to rapid access recorders and more particularly concerns methods and apparatus for rapidly searching for and reading out or recording at any one of a group of selected record medium areas.

2. Description of Prior Art

In the storage of information on various types of record media, such as magnetic or paper tapes, magnetic wires, drums or discs, information is often recroded in known sequence as discrete blocks, words or messages. It is frequently necessary however, to retrieve or play back recorded information, not in the sequence in which it has been recorded, but at a random selection. Thus, it is desirable to provide what is commonly termed a random access to the memory. Where the memory is made up of a stack of discrete bits, such as two-or three-dimensional matrices of toroidal cores for example, a true random access is available in that any given bit or group of bits may be selected for readout or for write-in. In a memory having a continuous information storage medium on the other hand, such as a drum, disc, tape or film strip, only a limited number of read or write heads are generally employed. Accordingly, the read or write heads must be caused to traverse the storage medium, passing blocks of data in sequence until a selected block is reached. To record information into the medium or to play prerecorded information therefrom, the tape is driven past the tape head at a relatively slow speed, the slower the speed the greater the storage capacity of the medium, within the limitations of recording and playback accuracy. Such playback or record speed may be as slow as 3 ¾ or 1 ⅞ inches per second in common machines, wherefor unacceptably long intervals of time are required to traverse any significant portions of a length of tape at such speed.

To avoid this time problem, various types of so-called random access arrangements have been employed in which the tape and its transporter mechanism are operated in a rapid search mode until a selected block of information is positioned at the record or playback head and tape speed is then changed to the much slower playback or record speed. Different types of systems for rapidly searching and reading a selected block of information from a magnetic tape have been devised. Many employ identifying indicia recorded on the tape together with the individual blocks of data so that unique blocks may be uniquely identified by specific coding bits or the like. When the specific code of the selected block of data has been recognized, the tape speed must be changed and playback is commenced.

A system of this type is shown in U.S. Pat. No. 3,541,271 of Joslow et al. In the Joslow et al. patent, cue signals recorded on the tape together with the desired information are read out during search and compared with a number representing a selected block of information. The tape is driven to a point where the desired program is recognized. Then the drive is stopped and reversed to return the tape to the beginning of the desired information block that was passed in the search mode. Now playback may commence. It will be seen that the system of Joslow et al. requires the record medium to carry identifying or cueing signals which not only limit the amount of useful information that may be contained on the tape but greatly increase the complexity of recording such information initially. The system of Joslow et al. requires a sepcially recorded tape and cannot be adapted to the playback of tapes that are not initially recorded with data block identifying indicia, such as cueing signals. Still another problem with the Joslow et al. system is the difficulty, complexity and time consumption involved in initially passing the desired data position, reversing once to return to the initial position and reversing again for playback.

Accordingly, it is an object of the present invention to provide a random access memory system which will enable rapid location of a selected storage medium area with a minimum of time and complexity.

SUMMARY OF THE INVENTION

In carrying out principles of the present invention in accordance with a preferred embodiment thereof, a desired area of an information storage medium is selected and the medium is driven relative to its record/-playback mechanism at a high speed, while continuously measuring the distance travelled from a reference position of the medium. Access time is greatly decreased by locating the reference position at an intermediate portion of the storage medium. Measured distance travelled is compared to a number representing the selected medium area. When the record/playback device has reached a point in advance of the slected area, tape speed is slowed and thereafter, recording or playback is commenced. According to a further feature of the invention, final approach of the record/playback device to the beginning of the selected medium area occurs at an intermediate speed that is less than the initial speed travel but faster than the record or playback speed. According to still another feature of the invention, when the recording or playback of the selected area has been completed the tape is rapidly returned to is reference position in a manner similar to that in which it was oringially advanced to the selected area. Suitable reference position indicia may be carried by the tape so that return to the reference position is accurately determined.

FIGS. *2a* and *2b* illustrates an arrangement of messages on a tape and corresponding counts of a message number counter.

Figure 1:
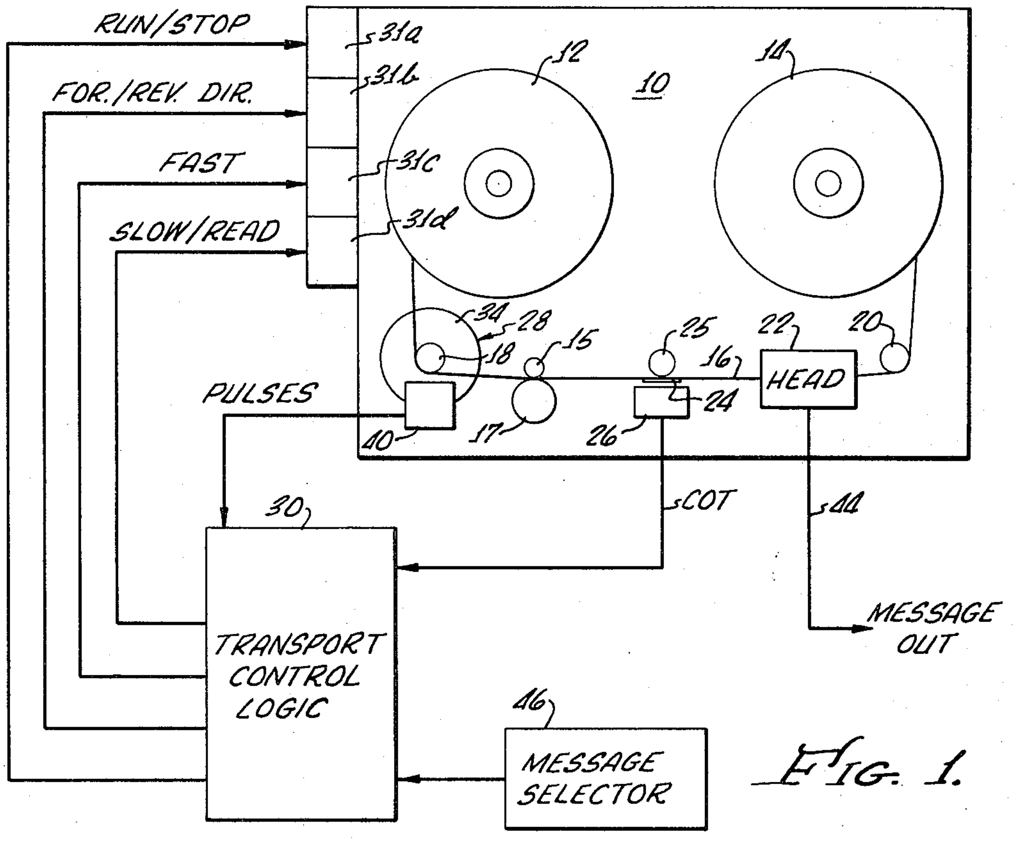
FIG. 1 illustrates the overall organization of a tape transporter, transport control and message selector embodying principles of the present invention.
Figure 3:
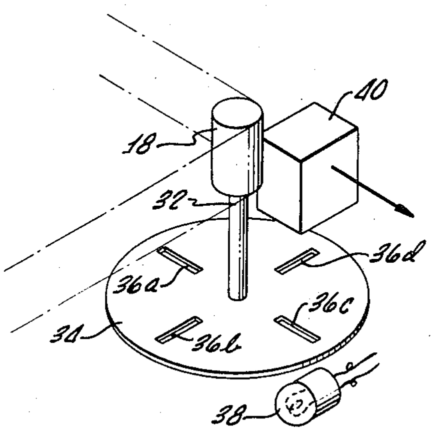

FIG. 3 schematically depicts portions of an optical pulse generator employed with a system of FIG. 1.

Figure 4:
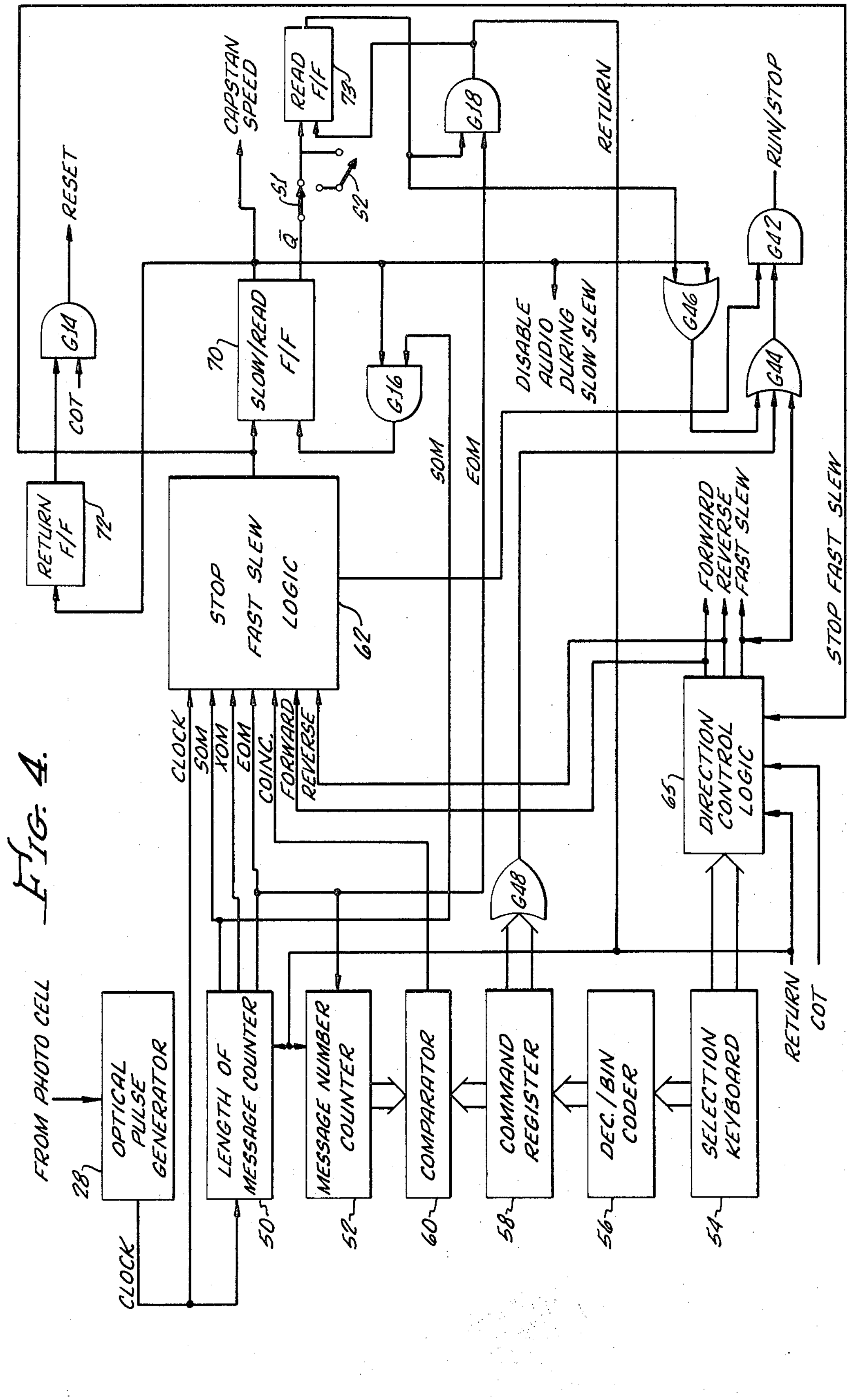

FIG. 4 illustrates details of the transport control for rapid access recorder of the type shown in FIG. 1.

Figure 5:
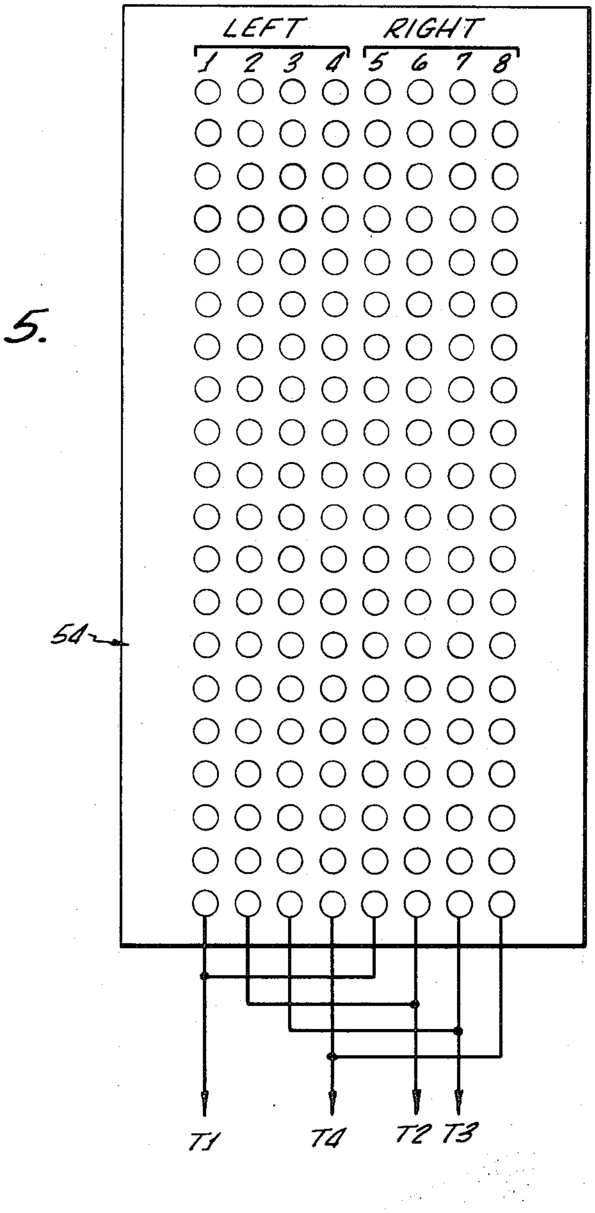

FIG. 5 illustrates an arrangement of a keyboard selector panel.

Figure 6:
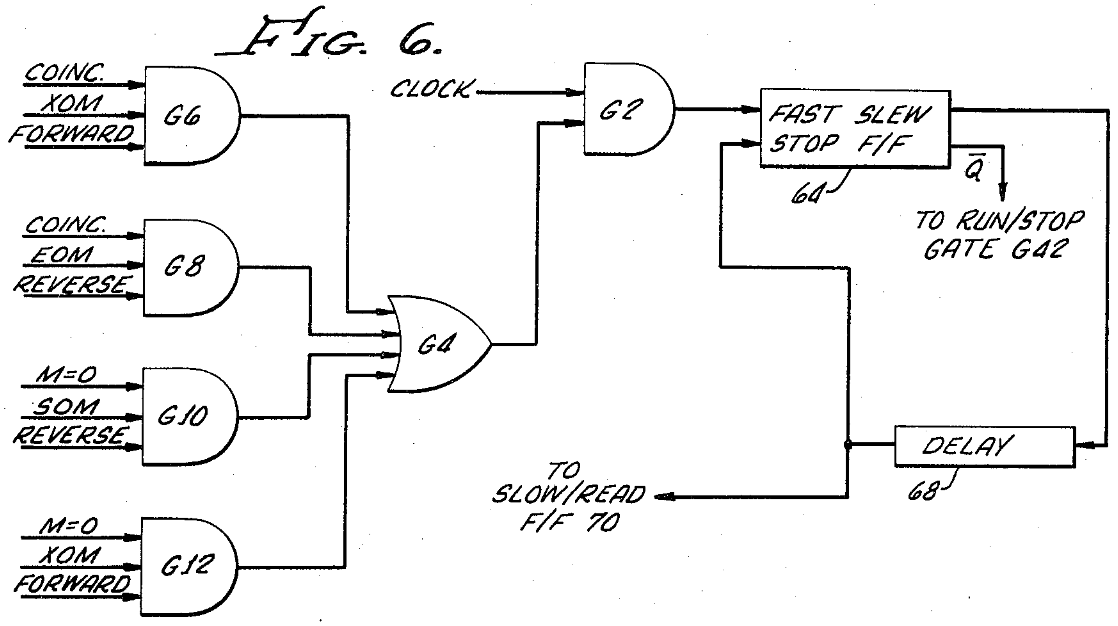

FIG. 6 shows logic of a stop fast slew circuit.

Figure 7:
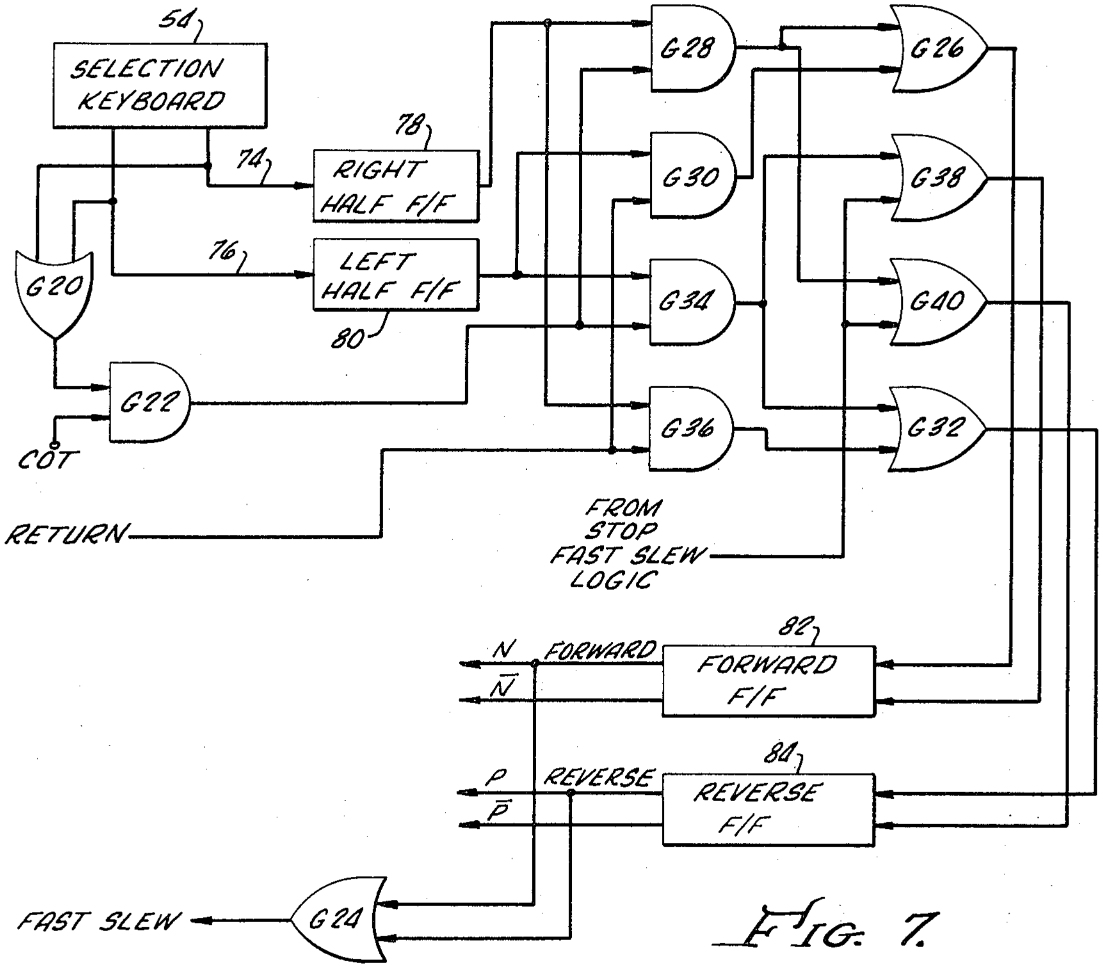

FIG. 7 shows logic of a direction control circuit.

DETAILED DESCRIPTION

Random access information storage systems and, in particular, random access tapes find wide application in a variety of systems. The present invention may be embodied in a teaching system in which a question selected by a student or teacher is played back for audible or visual display, or both, as from a magnetic sound tape, a magnetic video tape or a film strip having a magnetic audio track. The tape is prerecorded with a number of selected messages such as 160 individual messages each of a playback length of 30 seconds, for example. Thus, a given question is selected by operation of a question or message selector and the question is presented to the student. The student thereupon will choose an answer and the mechanism of such a choice may include actuation of an answer button which will cause automatic presentation of a correct answer to the previously selected question, such correct answer also having been stored on the same or a companion record medium. The present invention will be described in connection with the selection and presentation of a single message from a group of messages. Since the subsequent answer and answer presentation may be achieved by the same or other mechanisms these will not be described in this application.

As illustrated in FIG. 1, a conventional tape transport mechanism 10 employs a pair of tape storage reels 12, 14 each storing part of a length of a storage medium such as a magnetic tape 16. The tape is wound upon the reels 12, 14 and entrained over idler pulleys 18, 20 between which is mounted a record/playback mechanism 22 and a driving capstan and pinch roller 15, 17. A capstan motor drives at either 7 ½ or 3 ½ inches per second and reel driving motors provide high-speed drive while maintaining a suitable tape tension.

According to a feature of the present invention, the tape is normally (at rest) positioned in a reference position wherein substantially equal portions of the tape are stored on respective ones of the reels and wherein equal numbers of the recorded messages are likewise stored on the tape portions on the respective reels. In an exemplary embodiment wherein 160 30-second messages are recorded on a four-track tape, 80 message are recorded on the portion of the tape carried on reel 14, when in reference position, and the other 80 messages are recorded on the other half of the tape. To positively identify such reference position, a transparent portion 24 is included in the tape and a lamp 25 and photo sensor 26 are mounted in the transport mechanism so as to provide an output signal when the transparent strip 24 is positioned between the lamp 25 and the photo sensor 26.

Figures 2A, 2B:
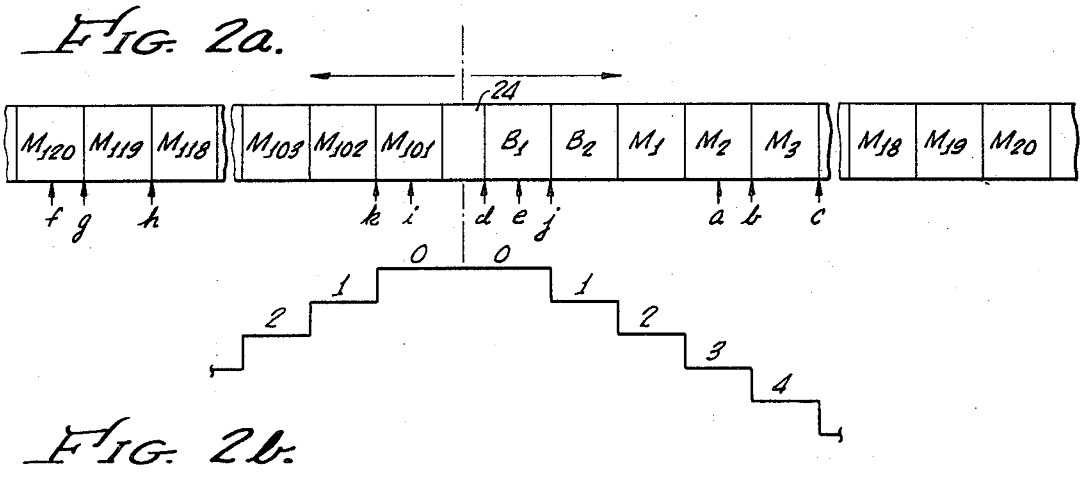

Shown in FIG. 2a is a single track of a four-track tape. The center of each track (COT) is a transparent section 24, one-fourth to one-half inches long. To the right of the section 24 the illustrated track is divided into 22 equal length (128 inches each, for example) sections $B_1$, $B_2$ and $M_1$ through $M_{20}$. $B_1$ and $B_2$ are blank sections and $M_1$ through $M_{20}$, respectively carry message numbers 1 through 20 inclusive. To the left of the strip 24, there are no blank areas but only equal length (128 inches each) message areas $M_{101}$ through $M_{120}$ which respectively carry message numbers 101 through 120, inclusive.

The tape transport mechanism 10 may be any one of a number of conventional transporters such as, for example, a TEAC A–4000S or A–4010S tape player or deck, manufactured by TEAC Corporation and modified to include the reference position photo sensing lamp 25 and sensor 26. An optical pulse generator 28 is also added to the standard transporter to measure tape length as will be described below. The standard transporter is further modified to have its normal operating functions such as playback, fast forward, rewind and the like, controlled by unique transport control logic 30 that is provided to implement the present invention. To this end, the pusbbutton controls of the machine are replaced by relays and relay drivers 31*a*, 31*b*, 31*c*, 31*d* and 31*e*. These relays perform the same functions as the pushbuttons of the conventional machine, but can be operated by electrical signals from the transport control logic.

As shown in greater detail in FIG. 3, the optical pulse generator 28 includes the idler pulley 18 having an elongated shaft 32 to which is fixed a disc 34 having a number of apertures or slots 36*a*, 36*b*, 36*c*, 36*d*. Mounted in the transporter on one side of the disc is a lamp 38 that directs a beam of light through the disc slots for reception by a photocell 40 that is also mounted in the transporter on the other side of the disc.

The tape head 22 is connected to suitable playback or record circuitry internally of the conventional machine.

Transport control logic 30 receives pulses from the pulse generator 28, a reference logic (COT) from the reference position sensor 26 and a message selection number from a message selector 46 that includes a group of numbered buttons or dials that may be operated to feed to the transport control logic 30 a number uniquely identifying the message that is to be selected. Transport control logic 30 feeds control signals to the respective relay drivers that operate the transporter mechanism. These signals include a run/stop signal, a direction (forward/reverse) signal, a fast slew control signal to command the highest transport speed, such as 200 inches per second, for example, a slow/read signal to cause a drive of either 7 ½ inches per second (slow) or 3 ½ inches per second (read). The fast slew may be the fast forward or rewind speed of the conventional tape transporter. A common friction brake may be employed to stop in either fast or playback speeds. Nevertheless, if deemed necessary or desirable, particularly where the simple friction braking will not provide a satisfactory stopping speed, a dynamic stop signal may also be provided to relay and driver 31*e* to employ the reel driving motors to achieve rapid stop from fast forward or reverse.

Sequencing of Tape Motion

Referring again to FIG. 2*a*, messages (or message areas) $M_1$ through $M_{20}$ are located on one track of the right half of the tape and messages $M_{101}$ through $M_{120}$ are located on the left half of the tape, with two blank message areas $B_1$, $B_2$ interposed at the beginning of the right half of the tape between the transparent center strip 24 and the first rigt side message $M_1$. For purposes of the present discussion, it will be presumed that each of the message areas $M_1$ through $M_{160}$ is a section of tape (on a single track) such as, for example, a section of 128 inches in length in which as been prerecorded a particular message that is to be selectively retrieved for audio presentation. For playback of a message selected from the right-hand side of the tape messages $M_1$ through $M_{20}$ (only one track need be considered for exposition), the tape is initially driven at high speed in a direction that is herein termed a forward direction. Looking down upon the transport mechanism as viewed in FIG. 1, the tape moves to the left when driven in the forward direction, being further wound upon reel 12 and unwound from reel 14. Obviously, the terms "forward," "reverse," "right" and "left" are employed for exposition and these may be changed as desired as long as the appropriate relations among them are retained. During high-speed traverse of the tape playback head over the tape, no readout occurs. As the tape head 22 reaches a point on the tape in advance of the selected message M, such as a point *a* (FIG. 2*a*) intermediate the message M–1, which preceeds the sekected message M, the tape is braked and stopped or at least substantially slowed. It is then driven at a lower speed until the beginning (point *b*) of the selected message is reached, at which time, the speed of the tape is changed to the desired read speed.

The read speed is lower than either the high-speed or low-speed approach drives and is the only speed at which playback takes place. Although high-speed is available in either direction, low and read are available only in forward direction, in this exemplary embodiment. Upon reaching the end, point *c*, of the selected message (on the right half) the tape direction is reversed and the tape is driven at high speed back to the reference position in a manner analagous to the driving of the tape in the forward direction for search of the selected message. In this reverse drive, in which the tape is being rapidly returned to the reference position, high-speed drive positions the tape once again at a point in advance of the desired position. In this return mode, the desired "advance" position is that in which the center of tape transparent strip 24 has passed the reference sensor 26 so that the slow approach speed in forward direction will bring the tape "home." Therefore, when point *d* (FIG. 2*a*) is sensed by the distance measuring devices, to be describe more particularly hereinafter, braking of the high-speed reverse drive is initiated. The braking of the high-speed drive is such that the momentum of the tape will carry it some 3 inches beyond the point of initiation of the braking. After such high-speed braking in the return from a right half search, tape speed and direction are changed to the slow forward approach speed. When in slow approach speed, the center of tape sensor 26 will provide a stop signal sufficient to precisely stop the tape at reference position. As indicated above, the standard tape machine to which the present invention has been applied can drive the tape in either direction at high speed, but will drive the tape at slow approach and playback speeds only in the forward direction. For this reason, searching and return from the right side search must be handled somewhat differently than searching and return from the left side tape search, as will be described hereinafter.

Nevertheless, principles of the present invention are readily adaptable to a machine in which tape drive in either forward or reverse direction is available at all speeds. In such an arrangement, the return from a right-side search will initiate braking of the high speed drive of the tape at a point *e* which is an intermediate portion of the last blank tape area $B_1$ and then slow slew drive will continue in the same reverse direction until the center of tape position is reached to positively stop the tape at reference position. In either case, whether bidirectional drive is available at all speeds or bidirectional drive is available only at high speed, the high-speed drive stop is initiated at a point in advance of the point on the tape that is to be identified and then the tape continues to the point to be identified at a considerably slower speed. For the purposes of this discussion, the term "advance" is used herein to identify a point ahead of the target point on the tape. This is a position that is reached before the target point when moving in the final approach, regardless of direction of such final approach.

Again considering the system described wherein low and playback speeds are only in the forward direction and high speed can be either direction, when a message such as $M_{119}$ is selected on the left half, the tape is driven at high speed (in reverse) to the point *f* which is a point intermediate the message $M_{120}$. $M_{120}$, on this half of the tape is a message that is in advance of the selected message $M_{119}$. Message $M_{120}$ is the message in advance of the selected message $M_{119}$ because the approach to and reading of the selected message will be in a forward direction. Accordingly, to reach the point *f* which is in advance of the selected message, braking of the high-speed drive is initiated at a point *g*, or at some other convenient point. Point *g* conveniently chosen as the point at the beginning of the selected message $M_{119}$. After initiation of the high-speed braking the tape momentum carries it to point *f* at which it is in advance of the desired target point, and the slow drive in the advancing (now the forward drive) direction is initiated to bring the tape back to the beginning of the selected message $M_{119}$ at which time playback speed and playback are initiated. When the tape reaches the end of the selected message, at point *h*, the high-speed drive then commences in the forward direction until a point in advance of the reference position has been attained. Such a point is indicated as *i*, at an intermediate point of message area $M_{101}$ of the left half of the tape. Now the high-speed drive braking is initiated and slow-speed drive continues until the center of tape optical signal provides an accurate stopping of the tape. To achieve the described mode of operation is is desirable not only to count the messages themselves so that the desired message may be identified, but it is also desirable to be able to identify a point or points intermediate an advance message. This is achieved by logic to be more particularly described hereinafter, which employs both a message number counter to identify the particular message involved and a length-of-message counter which keeps count of a number of incremental units within the length of each individual message that is traversed by the tape head during tape drive.

Transport Control Logic

Referring now to FIG. 4, during tape drive the optical pulse generator 28 provides a number of pulses which may be termed clock pulses for the described system. These pulses are fed to and counted by a length of message counter 50. For a given embodiment, each message has a length of 128 pulses, the arrangement being such that one pulse or one count of the length-of-message counter is provided for each one inch of tape. The lengthof-message counter is a modulo 128 reversible counter, counting to 127 and then starting again to count again from zero (or vice versa, when reversed). At each count of 127, which is termed the end-of-message (EOM) count of the length-of-message counter, a pulse is fed to a reversible message number counter 52 which accordingly always contains a number representing the total number of messages that have traversed a given point since strrt of the tape drive.

Referring now to FIG. 5, an exemplary keyboard selection panel 54 comprises eight columns of 20 buttons each which are grouped for purposes of selecting right side or left side of the tape and for selecting one of four tracks provided in the exemplary transport mechanism. The keyboard selection circuitry includes gating that will provide a "right" drive signal when any button in any of the four vertical columns on the right of the panel in FIG. 5 is selected. If any button in any one of the four vertical columns on the left half of the keyboard panel is selected, the selection keyboard will provide a "left" drive signal. Similarly, when any button in columns 1 and 5 is selected, a $T_1$ signal is provided to select the first tape track. When any button in columns 2 and 6 is selected, the second tape track is selected, and similarly, tracks 3 and 4 are selected by buttons in columns 3 and 7, and 4 and 8, respectively. Details of the use of these "right" and "left" direction signals will be described more particularly hereinafter. In any event, when a given button on the selection keyboard is depressed, a signal is sent to a decimal to a binary encoder 56 (FIG. 4) which thereupon stores in a command register 58 the number that uniquely identifies the selected message. Messages on opposite tape halves are paired for their unique identifying numbers so for a single track, for example, that message number 1 (on the right side) has the same identifying number stored in the command register as message number 101 (on the left side). Similarly, messages 2 and 102, 3 and 103, etc., through and including the corresponding final pair of messages 20 and 120 on the right side and left side of the first track. Messages on the other tracks are similarly paired.

The depression of a selected number on the keyboard not only inserts a unique message identifying number into the command register and sends out a direction (right or left search) signal but it also provides a start (search) signal that initiates the high-speed drive in the appropriate direction. Now as the clock signals are counted by the length-of-message counter, at each end-of-message (the count of 127), a signal is fed to the message number counter 52 which augments its count by 1. The numbers in the message number counter and the command register are continually compared by a comparator 60 which provides an output signal indicating a coincidence of the compared numbers. This coincidence signal is fed to a stop fast slew logic circuit 62 that also receives a number of other signals as indicated in the drawings. These other signals include the clock, SOM (start-of-message) signal that indicates zero count of the length-of-message counter, an XOM or intermediate part of the message signal (such as an exemplary count of 64 of the length-of-message counter), and forward and reverse drive signals from a direction control logic circuit 65 to be more particularly described hereinafter.

Stop Fast Slew:

The purpose of the stop fast slew logic is to initiate the braking of the high-speed drive and to provide a signal that will change the drive speed to the slow slew (7 ½ inches per second in the described embodiment).

Referring now to FIG. 6, the stop fast slew logic includes a fast slew stop flip flop 64 that is set by the output of an AND gate G2 upon coincidence of a clock signal and an output from an OR gate G4 having four inputs from the logic of four high-speed drive conditions. These four high-speed drive conditions, as previously indicated, include a high-speed drive when searching for a message on the right side of the tape, a high-speed drive when searching for a message on the left side of the tape, high-speed drive when returning from a right side search and a high-speed drive when returning from a left side search.

To initiate the fast slew stop when searching the right side of the tape, an AND gate G6 receives the coincidence signal from the comparator 60 which indicates a coincidence of the selected message number with a message in advance of the selected message. Thus, when selecting message M, the coincidence signal will occur when the message M–1 is reached. Although this identification of M–1 may be achieved by various logic circuits, it is convenient to implement this identification of the message in advance of the selected message for drive to the right side of the tape by positioning the messages as shown in FIG. *2a.*

Two blank message areas $B_1$, $B_2$, each of the common and equal 128 inches message area length, are provided between the first reference message $M_1$ and the center reference position. With all counters reset (at the reference position), when the tape starts to move in the forward direction (for a right side search) the message number counter remains at zero through the end of the first message area $B_1$ during which time the length-of-message counter is counting up to its count 127. When the count of 127 is reached at point *j*, an EOM signal or end-of-message signal is fed to the message number counter which then reads the count of 1. At the end of the second blank area, $B_2$, the message number counter again augments its count and reads 2. At the end of the first message unit $M_1$, the message number counter is caused to read 3, and so on. Accordingly, it will be seen from comparison of FIGS. 2*a* and 2*b* that when the tape is at the area of message $M_1$, the message number counter holds the count of 2 so that the message number counter is always reading (for the right side search) one number higher than the message number that is actually positioned at the tapehead. Accordingly, if message $M_3$ has been selected, the message number counter will read its count of 3 when the tape head is at message area 2.

As will be recalled, in the high-speed drive to the right side of the tape, it is desired to stop at a point in advance of the selected message. Accordingly, with the message number counter at reading three, an intermediate count of the length-of-message counter will identify an intermediate point of $M_2$ that is in advance of the target message $M_3$. Thus, the signal XOM FIG. 6) is the second input to the search right AND gate G6 and identifies an intermediate point of the advance message, such as a midpoint, at the count of 64 of the length-of-message counter 50. The third input to AND gate G6 identifies the direction of high-speed drive, which for a search right is a forward direction.

For a search to the left side of the tape, the first two inputs to an AND gate G8 are again a coincidence signal from the message number counter and a signal from the direction control logic identifying direction of high-speed drive which is in this case, the reverse direction. However, since the high-speed drive is in reverse direction and the slow approach and the playback are forward, the point in advance of the selected message (from which the slow speed approach is initiated) is determined by an end-of-message (EOM) count. As previously described, the momentum of the high-speed drive carries the tape about 3 inches and 3 counts beyond, to a point in advance of the beginning of the selected message. From this advance point, the slow approach speed commences in the forward direction.

In return from the right search, the high-speed drive is in the reverse direction as indicated by a first input to the right return AND gate G10. For coarse position indication a predetermined message number involved, which is the message number count of m = 0.

With reference to FIGS. 2*a* and 2*b*, it will be seen that upon return from right search, the message number counter (now counting down) will regain its zero count at point *j* which is the beginning of blank message area $B_2$. Stop fast slew is initiated by the start of message count, the zero count of the length of message counter, which occurs at point *d*, FIG. 2*a*. The momentum of high-speed rive carries the tape about 3 inches beyond the ¼ to ½ inch width of transparent strip 24 where the slow speed approach forward drive commences. This drive continues until the reference position is reached at which time the stop signal from the optical reference sensor firmly and accurately stops the tape in its reference position.

A fourth AND gate G12 provides an input to the fast slew stop flip flop OR gate G4 from the logic for initiation of high-speed stop upon return of a search to the left. To this end, a forward direction signal is provided from the direction control logic 65 and again, course positioning is provided by the message number counter at a count of M=0. As will be seen from inspection of FIGS. 2a, 2b, the message number counter is counting down upon the return from a left search, and will reach the count of zero at the end (point *k*) of the first message on the left side. Fine positioning is provided to identify the intermediate point *i* of the first message $M_{101}$. Thus, the high-speed drive stop is initiated at an intermediate point in advance of the home position and the slow speed approach then continues for nearly one-half of the length of the first message area $M_{101}$ until the home position is reached.

The four outputs of the coincidence gates G6, G8, G10 and G12 are fed through the OR gate G4 and thence in coincidence with a clock signal to the setting input of the fast slew stop flip flop 64. The latter, when set, provides an output by means of a oneshot circuit 66 to relay and relay drive 31*e* (FIG. 1) that momentarily sends a dynamic stop or brake signal to the reel-drive motors of the transport mechanism. Other suitable high-speed drive braking mechanism may be used. Details of the stopping mechanism may be varied without departing principles in the present invention.

After a suitable delay in circuit 68, the output of the fast slew stop flip flop is fed to set a slow/read flip flop 70 as indicated in FIG. 4. This flip flop, when set, provides a two-state signal at its capstan speed output which is fed to relay and relay drive 31*d* to control the speed of the motor that drives the capstan, providing a precision drive at either 7 ½ inches per second in one state of the flip flop or at 3 inches per second in the other state of the flip flop. The output of the stop fast slew flip flop 64 (from delay 68) is also fed to reset flip flop 64 and to the direction control logic 65 as will be described more particularly below.

The output of the slow read flip flop 70, when high, commands the slow speed approach of 7 ½ inches per second. This output may also be employed to disable audio output during slow-speed approach, if deemed necessary or advisable.

It is only during this slow-speed approach that the tape will be stopped in its reference or home position. Accordingly, this slow-speed approach signal from the slow/read flip flop is fed to a return flip flop 72 that provides an output to enable an AND gate G14 which receives as its second input the COT or center of the tape signal from the optical reference sensor 26. The output of AND gate G14 is employed to reset all circuits.

The output of the slow/read flip flop, when in slow approach condition, enables an AND gate G16 which receives as its second input the SOM or start-of-message signal from the length-of-message counter 50. Therefore, AND gate G16 identifies the position at which playback is to be initiated. At this time, the slow/read flip flop is reset by the output of Gate G16 and its now high output $\bar{Q}$ is fed to set a read flip flop 73. Reading occurs while the read flip flop is set. The output of the latter, when set, provides a first input to an AND gate G18 which has its second input from the end-of-message count (EOM) of the length-of-message counter to thereby identify the end of reading of the selected message. The output of gate G18 accordingly is fed to reset the read flip flop 73 and also provides an end-of-read (return) signal which commands return. The return signal is fed to change the counting direction of the reversible length-of-message and message number counters and also to provide an input to direction control logic 65.

Direction Control Logic

Referring now to FIG. 7, the direction control logic receives from the selection keyboard first and second signals on lines 74, 76 indicating selection of a message on the right half of the tape or the left half of the tape, respectively. These signals are fed to set right half and left half flip flops 78, 80, respectively. Both of these signals are fed through an OR gate G20 to enable a start AND gate G22 that receives as its second input the output of the reference sensor, the COT signal, so that start of the search can only be initiated when in reference position. Direction control is provided from the output N of a forward flip flop 82 and from the output P of a reverse flip flop 84. The N and P outputs of these two flip flops are fed through an OR gate G24 to provide the fast slew signal to the relay and relay drive 31*c* of FIG. 1. The forward flip flop 82 is set from the input of an OR gate G26 that receives a first input for a right search from an AND gate G28 that is enabled by the right half select signal and a search start signal from start AND gate G22. Alternatively, the forward flip flop 82 is set by AND G30 for a left return mode by a left half signal from left half select flip flop 80 and a return signal provided at the output of gate G18 of FIG. 4.

The reverse flip flop is set from the output of an OR gate G32 that receives a first signal from an AND gate G34 identifying a left search. This AND gate receives a first signal from the left half flip flop 80 and a second signal from the search start gate G32. The second input to OR gate G32 of the reverse flip flop is provided for a right return condition from an AND gate G36 that receives a first input from the right half flip flop and a second input from the return signal.

Each of the forward and reverse flip flops is reset from the output of OR gates G38 and G40, respectively. Thus, when right search is commanded, to set the forward flip flop, the reverse flip flop is reset by OR gate G40. Similarly, when a left search is commanded, to set the reverse flip flop, the forward flip flop is reset by the OR gate G38. Further, both forward and reverse flip flops are set via these resetting OR gates G38, G40 from the stop fast slew signal provided at the output of delay 68 in FIG. 6.

Thus, it will be seen that whenever a start signal appears, as by selection of a given message (by pressing a button on a selection keyboard), one of the forward and reverse flip flops is set to provide the signals N or P. Outputs of the forward and reverse flip flops then are fed to the stop fast slew logic (FIS. 6) and to relay and driver 31*b*. The fast slew signal from gate G24 is fed to relay and driver 31*c* to initiate high-speed drive.

Referring again to FIG. 4, the fast slew signal from the direction control logic is inverted in a gate G42 to provide a first enabling input to a run/stop AND gate G44 that provides an output to the driver and relay 31a (FIG. 1). Thus, this run/stop AND gate G44 is enabled only in the absence of a fast slew drive signal. A second input to the run/stop AND gate is provided from an OR gate G46 which receives as its first input the output of the read flip flop 73 indicating that read or playback is occurring. A second input to this OR gate is provided from the high output of the slow/read flip flop 70 which indicates that the slow approach speed (7 ½ inches per second) is occurring. Therefore, during either read or slow-speed approach, and in the absence of a fast slew command, the output of the run/stop AND gate will provide a run signal to the transport mechanism. When the output from this gate is low, the transporter is stopped.

When the forward/reverse flip flops are reset by the stop fast slew output (by output of the stop fast slew flip flop 64), they will remain reset during the subsequent slow-speed approach and throughout entire playback. Only upon end of the playback or reading, when the return or end of read signal occurs, will an appropriate one of the forward or reverse flip flops be again set to thereby provide the fast slew drive signal for the high-speed return. flops be again set to thereby provide the fast slew drive signal for the high-speed return.

The run/stop OR gate G44 has a third input from an OR gate G48 that receives inputs from command register stages so that when the command register contains any number (other than zero), the output of OR gate 48 is high to provide another enabling input to the run/-stop gate G44. The command register and the other registers, flip flops and counters, are reset by the reset signal at the output of AND gate G14. When run/stop AND gate G42 is disabled, its output goes low and a stop signal is provided.

Although the specific embodiment described herein relates to playback of a selected one of a group of prerecorded messages, it would be readily appreciated that the described logic and tape arrangement may also be employed to selectively record messages at predetermined locations on an information storage media. To this end, a switch S1 is provided between the output of slow/read flip flop 70 and the setting input of the read flip flop 73. In the illustrated playback position of the switch, the operation is as previously described for playback of a selected message. When S1 is moved to the other position (recording mode) for recording on the tape, the switch will command a tape stop signal (by circuitry not shown). Thus, when in recording mode, the tape moves to the beginning of the desired message area and stops. The tape operation may be commenced in recording mode by thereafter selectively moving a second switch S2 up to its closed position (not illustrated) to thereby again complete the circuit from the $\bar{Q}$ output of the slow/read flip flop to the set input of the read flip flop. Switch S2, when in recording position, will energize the recording head to thereby initiate recording as the tape traverses the selected message area. The remainer of the operation upon completion of the recording of one selected message area remains the same as previously described in connection with the playback operation. Thus, after completion of the recording, the tape rapidly returns to reference position.

Although the present invention has been described in connection with a specific embodiment and for use with a specific transport mechanism, it will be readily appreciated that the principles of the invention are adaptable to different types of reel or cartridge transport mechanisms, for magnetic tape, optical film, digital data in the forms of magnetic bits or holes punched in tape and even to the automatic selection and presentation of series of slides projected by an automatically stepping slide projector. For any application, the various speeds may be chosen for optimum operation time. Thus, the exemplary speeds described herein are 200, 7 ½ and 3 ¼ inches per second, but these may be varied as deemed necessary or desirable. Further improvements in access time and operation of the equipment may be achieved by employing a high-speed drive of as much as 400 inches per second, a slow-speed or approach drive of 60 inches per second, and a read or record speed of the common 1 162 inches per second. Further, the advance intermediate point at which slow speed approach commences can be moved closer to the actual point at which access (playback or recording) is begun. This may be achieved by selecting another count of the length-of-message counter for "XOM."

The foregoing detailed description is to be clearly understood as given by way of illustration and example only, the spirit and scope of this invention being limited solely by the appended claims.

What is claimed is:

1. Apparatus for accessing a storage medium having a number of successive storage areas thereon positioned on either side of an intermediate point of the medium, said apparatus comprising an access mechanism for said medium, means for selecting a storage area to be accessed, means responsive to said selecting means for driving said medium at a first speed relative to said access mechanism in one direction or the other according to whether the selected area is on one side or the other of said intermediate point, coarse approach means for counting areas passed during driving of said storage medium, fine approach means for generating increment signals indicative of points of each area passed during said driving, approach drive means responsive to both said coarse and fine approach means for decreasing said first speed to an approach speed, means responsive to said approach drive means and to said fine approach means for generating an identifying signal indicative of the beginning of said selected storage area, means responsive to said identifying signal for changing said approach speed to an access speed and for initiating access of the selected area, means for generating a reference signal when said medium is positioned at a reference position wherein a substantially central point thereof is adjacent said access mechanism, means for driving said medium toward said reference position at said first speed, means for causing said approach drive means to decrease said first speed at a point in advance of said reference position, and means responsive to said approach drive means and to said reference signal for stopping the medium at said reference position.

2. A method of information storage and retrieval comprising the steps of selecting and identifying a reference point intermediate the ends of a strip of storage tape, dividing the tape on both sides of said reference point into message areas of predetermined lengths of said tape wherein each area is located on the tape at a predetermined distance from said reference point, and recording messages in at least a plurality of said areas on both sides of said reference point, positioning the tape in a reference position wherein substantially equal lengths of the tape are located on opposite sides of a readout device, selecting one of said areas for readout, driving the tape from said reference position in one direction or the other and measuring distance travelled independent of indicia carried by the tape, reading a message from the tape when the measured distance attains the predetermined distance of the selected area from the reference point, and returning the tape to said reference position upon completion of each reading of a message, whereby the tape is ready to have another message area read and the readout device is positioned substantially at the midpoint of the tape to minimize the distance to be travelled to message areas on either side.

3. The method of claim 2 wherein said step of returning the tape to the reference position comprises measuring distance travelled by the tape independent of indicia carried by the tape and wherein both of said steps of measuring distance travelled by the tape to and from the reference position comprise counting increments of distance travelled, and including the step of sensing said reference point to determine when the tape reference position has been attained, and resetting the increment distance count when the reference position has been attained.

4. The method of claim 3 wherein the steps of driving the tape from the reference position and to the reference position include the steps of driving the tape at a fast speed until it has obtained a measured distance less than the predetermined distance from or to the reference position and thereafter driving the tape at a relatively slow speed until it attains said predetermined distance from the reference position or until it obtains said reference position.

5. A random access memory comprising a tape transport mechanism comprising a pair of tape storage reels, tape drive means, tapehead means mounted to traverse a tape for recording or playback, a tape reference sensor, and control means for driving a tape in either direction at a fast speed and for driving the tape at a slow speed, a tape having first and second portions thereof stored on said first and second reels, respectively, in a reference position of said tape, said tape having a reference substantially at its midpoint and having a plurality of data areas of predetermined lengths located at predetermined distances, respectively from said reference, an area selector panel including selector means for generating a signal representing a selected data area on the tape, means for causing said transport mechanism to drive the tape at said fast speed when said selected data area signal is generated, storage register means responsive to the selector panel for storing a number representing the predetermined distance of the selected data area from said reference, means independent of indicia carried by the tape for generating a pulse for each unit of distance traversed by the tape as it is driven by the transport mechanism, a first counter for counting said pulses, a second counter responsive to said first counter for counting groups of said pulses, comparator means responsive to said storage register and said second counter for generating a comparison signal output when distance travelled by the tape from the reference is a selected amount less than the predetermined distance of the selected data area, means responsive to said comparator means output for causing said transport mechanism to drive the tape at said slow speed, means for actuating said tapehead means as the selected area is traversed thereby, and means for rapidly returning the tape to said reference position upon completion of traverse of the selected area.

6. The memory of claim 5 wherein said means for rapidly returning the tape to said reference position comprises said midpoint tape reference and said tape reference sensor and means responsive thereto for stopping the tape at the reference position and for resetting said counters and register.

7. The random access memory of claim 6 wherein said control means includes means for driving the tape in either direction at said fast speed and for driving the tape at a tapehead speed that is slower than either of said first mentioned speeds, and further including means for sensing the beginning of traverse of the selected data area by said tapehead means, and means responsive to said sensing means for causing said transport mechanism to drive the tape at said slower tape head speed.

8. The memory of claim 5 including means responsive to said selector means for intitiating a search mode and for controlling direction of said fast slew speed during said search mode to cause the tape to be driven in one direction or the other when the selected data area is on said first or second tape portions.

9. The memory of claim 8 wherein said slow speed is in the same direction as said fast slew speed when the selected data area is on said first tape portion and wherein said slow speed is in the opposite direction as said fast slew speed when the selected data area is on said second tape portion.

10. The memory of claim 8 wherein said means responsive to said comparator means comprises a. first coincidence means responsive to one count of said first counter and to an output of said comparator means for generating a speed change signal when said fast slew speed is in one direction, and b. second coincidence means responsive to another count of said first counter and to an output of said comparator means for generating a speed change signal when said fast slew speed is in the other direction, and means responsive to said speed change signal for decreasing tape speed to said slow speed without change of direction when said fast slew speed is in one direction and for decreasing tape speed to said slow speed and concomitantly reversing direction when said fast slew speed is in said other direction.

11. The memory of claim 8 wherein said means for returning the tape comprises means responsive to said counters for initiating a return mode and generating a return signal, means responsive to said return signal for causing said transport mechanism to drive the tape at said fast slew speed in a direction to return the tape to said reference position, third coincidence means responsive to an output of said second counter and a selected count of said first counter for generating a speed change signal when said fast slew speed in return mode is in one direction, fourth coincidence means responsive to an output of said second counter and a selected count of said first counter for generating a speed change signal when said fast slew speed in return mode is in the other direction, means including said tape reference sensor for generating a reference signal when said tape is at said reference position, and means responsive to said reference signal and to said speed change signal for stopping the tape and for resetting the counters and register.

* * * * *